United States Patent [19]

Buck

[11] Patent Number: 4,699,389
[45] Date of Patent: Oct. 13, 1987

[54] WORKHOLDER

[76] Inventor: James R. Buck, 1902 SE. 36th St., Cape Coral, Fla. 33904

[21] Appl. No.: 771,456

[22] Filed: Aug. 30, 1985

[51] Int. Cl.⁴ .............................................. B23B 5/22
[52] U.S. Cl. ......................................... 279/52; 279/47
[58] Field of Search ...................... 279/43, 52, 53, 74, 279/2 R, 47, 58, 59

[56] References Cited

U.S. PATENT DOCUMENTS

| | | | |
|---|---|---|---|
| 2,326,322 | 8/1943 | Bell | 279/53 |
| 2,733,925 | 2/1956 | Denzler | 279/43 |
| 2,856,192 | 10/1958 | Schuster et al. | 279/43 X |
| 3,727,930 | 4/1973 | Anderson | 279/43 X |
| 3,841,645 | 10/1974 | Parsons | 279/43 X |
| 4,477,095 | 10/1984 | Atkinson | 279/52 X |

FOREIGN PATENT DOCUMENTS 601190  4/1948  United Kingdom .................. 279/43

OTHER PUBLICATIONS

Jacobs Collet Chucks, 1980, The Jacobs Manufacturing Co. Catalog No. 300A-980-30M, Bloomfield, Conn. 06002.
Photocopy of Hardinge 5C Hardinge Step Chucks and Closers, p. 11.

Primary Examiner—Robert L. Spruill
Assistant Examiner—Steven P. Weihrouch
Attorney, Agent, or Firm—Flynn, Thiel, Boutell & Tanis

[57] ABSTRACT

A workholder arrangement which employs a support module which can have one of several different workpiece-engaging units interchangeably mounted thereon so that the same workholder module can be readily adapted to function several different ways, such as a collet chuck, a step chuck and an expanding mandrel. The support module has a housing which attaches to the basic machine tool and slidably supports therein an activating sleeve defining an interior conical surface thereon, the activating sleeve being adapted for direct connection to and being axially movable by a draw or push bar.

18 Claims, 10 Drawing Figures

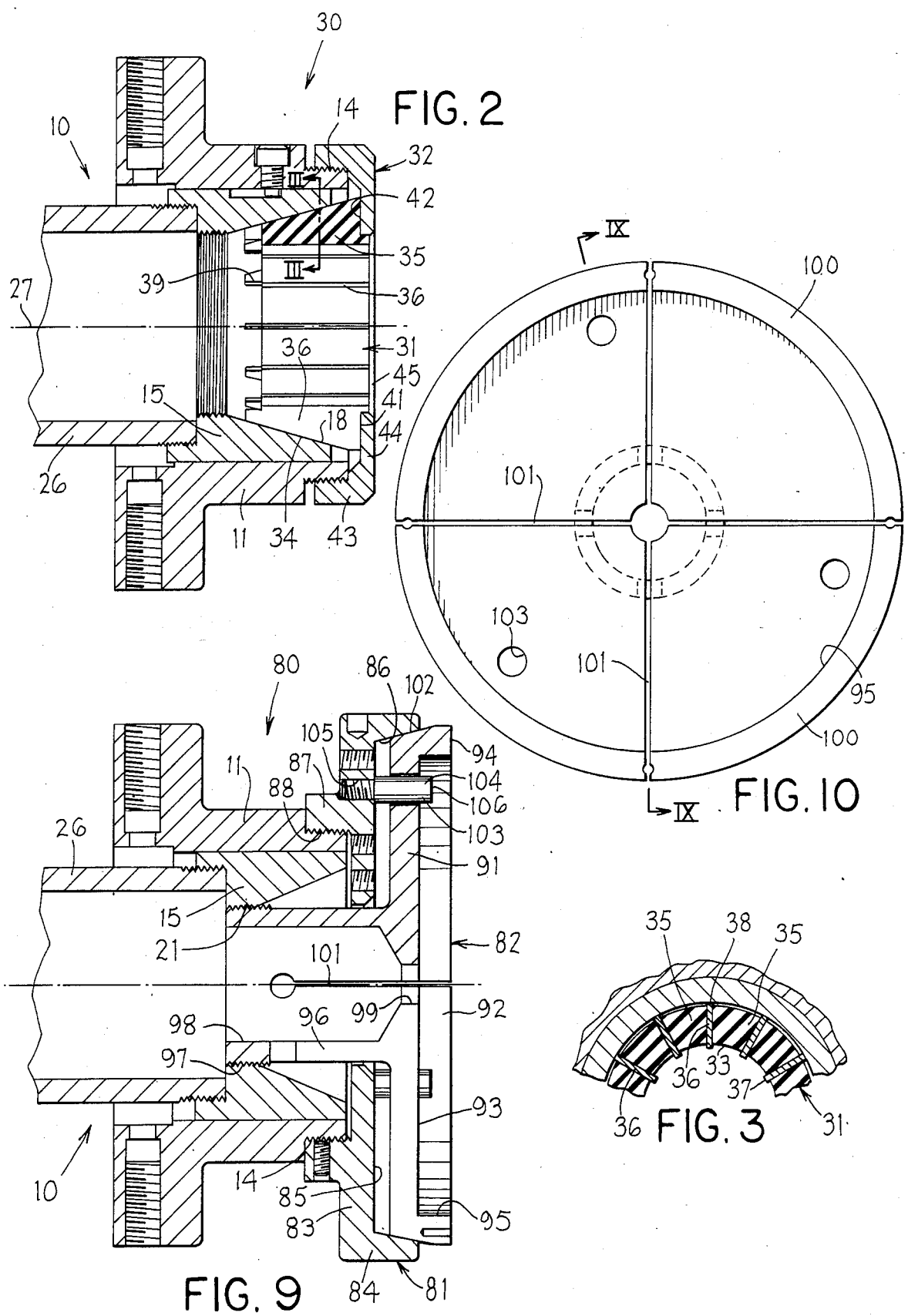

WORKHOLDER

FIELD OF THE INVENTION

This invention relates to an improved workholder employing a workholder module which can be readily adapted to function as a collet-type chuck, an expandible mandrel or a step-type chuck.

BACKGROUND OF THE INVENTION

Various types of chucks and mandrels are utilized for supporting workpieces to permit machining and finishing operation to be carried out thereon. Such chucks and mandrels, herein referred to as workholders for convenience in description, are typically designed to create a specific supporting or gripping cooperation with a workpiece and, as such, several different workholders must often be provided in order to permit a wide variety of machining or finishing operations to be carried out. If such operations are to be carried out on a single machine tool, then the changing from one workholder to another is typically a rather complex and time consuming operation. In addition, a typical workholder is normally suitable solely for a very limited size range of workpiece, and the changing or modifying of the workpiece to accommodate a different size of workpiece is generally a complex and time consuming operation.

There is known a collet-type chuck which employs a collet employing a plurality of rubberlike segments joined to intermediate plates so as to define a collet sleeve, the sleeve having an outer conical surface which is acted on by a stationary wedging surface to effect compression of the collet sleeve into engagement with a workpiece. In this known arrangement, the forward end of the collet sleeve is acted on by an axially movable cap, the latter being axially displaced in response to rotation of an external nut. Hence, with this arrangement, both the actuating cap (which defines the front face of the chuck) and the collet sleeve are moved axially inwardly during actuation, and hence this draws the workpiece inwardly and prevents accurate axial positioning of the workpiece.

Accordingly, it is an object of this invention to provide an improved workholder arrangement which employs a support module which can have one of several different workpiece engaging units readily and interchangeably mounted thereon so that the same workholder module can be readily adapted to function several different ways, such as a collet chuck, a step chuck and an expanding mandrel. The improved workholder arrangement of this invention hence greatly simplifies the interchanging of the primary function of the workholder, and at the same time facilitates the interchanging of the workholder to accommodate different size ranges.

A further object is to provide an improved workholder arrangement, as aforesaid, which can be adapted to form a collet-type chuck employing a deformable collet sleeve constructed of an elastomeric material to enable gripping of workpieces having a wide range of sizes and properties, and the gripping of workpieces over only a short axial extent thereof. An improved workholder employing this elastomeric collet sleeve cooperates with an axially-movable actuator, such as a draw or push bar, to permit actuation of the elastomeric collet sleeve without causing axial movement thereof so as to permit accurate axial positioning of the workpiece during gripping thereof.

A still further object of the invention is to provide an improved workholder arrangement, as aforesaid, which employs a support module having a housing which attaches to the basic machine tool and slidably supports therein an activating sleeve defining an interior conical surface thereon, the activating sleeve being adapted for direct connection to and being axially movable by a draw or push bar. To create a collet chuck, an elastomeric sleeve is positioned within the conical bore of the activating sleeve and is restrained therein by an end cap which is threadably secured to the front end of the housing so that, upon forward axial displacement of the activating sleeve, the elastomeric collet sleeve is radially compressed inwardly for gripping the workpiece, the elastomeric collet sleeve being axially restrained by its engagement with the removable end cap. To convert to an expanding mandrel, the end cap and collet sleeve are removed, and a slidable actuator is positioned within the housing so as to abut against the forward end of the activating sleeve. The actuator has a forwardly projecting conical wedge which is received within a conical bore formed in a split cylindrical mandrel, the latter having an integral mounting plate which is threaded onto the front end of the housing. Axial displacement of the activating sleeve by the push bar, and corresponding axial displacement of the actuator causes resilient radial expansion of the mandrel for gripping a workpiece. To convert the workpiece arrangement to a step-type chuck, the mandrel and actuator are removed from the support module, following which an end cover or closer is threaded onto the forward end of the housing, and a substantially cylindrical chuck plate having a rearwardly projecting threaded stem is inserted into the activating sleeve and threadably coupled thereto. The chuck plate and closer have cooperating conical surfaces therebetween, and the chuck plate is radially split so as to be elastically radially deformed inwardly for gripping a workpiece which is positionable within a recess formed in the front face of the chuck plate. The closer also mounts thereon stop pins which project axially through openings in the chuck plate into the bottom of the workpiece-receiving recess for defining a stop surface and hence a limiting or positioning plane for the workpiece.

Other objects and purposes of the invention will be apparent to persons familiar with structures of this general type upon reading the following specification and inspecting the accompanying drawings.

BRIEF DESCRIPTION OF THE DRAWINGS

FIG. 2 is a central sectional view illustrating the workholder module adapted for functioning as a collet-type chuck.

FIG. 3 is a fragmentary sectional view as taken substantially along line III—III in FIG. 2.

FIG. 9 is a central sectional view illustrating the workpiece module modified to function as a step-type chuck.

FIG. 10 is a front view of the chuck plate illustrated in FIG. 9.

Figure 1:
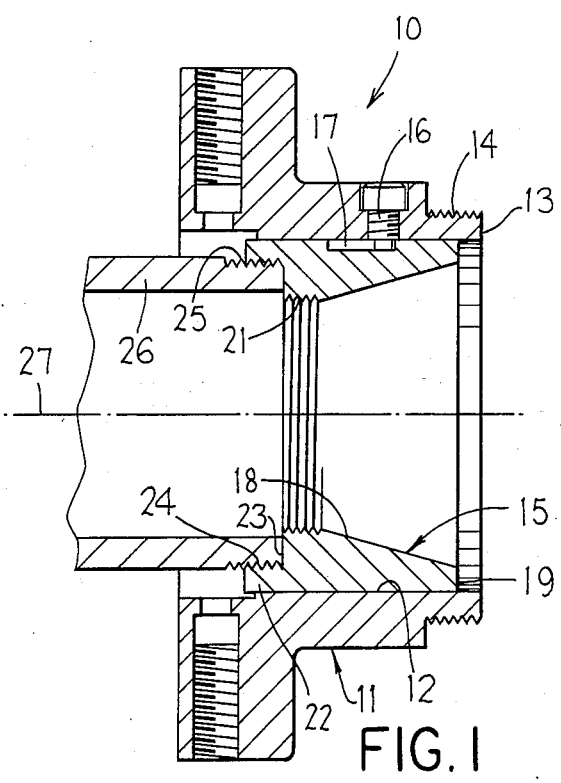
FIG. 1 is a central cross-sectional view of the workholder module associated with the workholder assembly of this invention.

Certain terminology will be used in the following description for convenience in reference only, and will not be limiting. For example, the words "upwardly", "downwardly", "rightwardly" and "leftwardly" will refer to directions in the drawings to which reference is made. The word "front" will refer to the end of the workpiece assembly from which the workpiece extends, namely the rightward end in FIGS. 1, 2, 7 and 9, and the word "rear" will refer to the opposite end of the workpiece assembly. The words "inner" and "outer" will refer to directions toward and away from, respectively, the geometric center of the assembly and designated parts thereof. Said terminology will include the words specifically mentioned, derivatives thereof, and words of similar import.

DETAILED DESCRIPTION

Referring to FIG. 1, there is illustrated a workholder module 10 according to the present invention, which module can be readily adapted to create a significant number of different workholder functions. This module includes a support sleeve or housing 11 which is adapted to be mounted on a conventional machine tool, such as a lathe. This housing 11 has a substantially cylindrical bore 12 extending coaxially therethrough. Housing 11, at its forward end 13, is externally threaded at 14.

An activating sleeve 15 is axially slidably supported within the bore 12 of housing 11. A set screw 16 is mounted on the housing and the end thereof projects into an axially elongated slot 17 formed in the sleeve 15 for limiting the axial displacement of the latter. Sleeve 15 defines therein a conical bore or wall 18 which is concentric with the longitudinally extending axis 27 of the workholder module, whereby the conical bore 18 diverges as it projects axially forwardly. The activating sleeve 15 defines a front end wall 19 thereon which, when the sleeve is in the rearwardmost position illustrated by FIG. 1, is spaced rearwardly from the front end wall 13 of the housing.

The conical wall or bore 18, at its rearward end of minimal diameter, terminates in a bore 21 which projects axially rearwardly of the sleeve, this bore 21 being internally threaded. An annular flange 22 projects axially rearwardly of the sleeve 15, which flange projects rearwardly from a shoulder 23 which is defined substantially at the rearward end of the bore 21. Flange 23 is internally threaded at 24 so as to be threadably engaged with external threads 25 formed on the forward end of an elongated activating tube 26. This activating tube 26, known as the draw or push tube as conventionally associated with a machine tool such as a lathe, is axially movable for activating the sleeve 15 in a manner which is well known.

Referring now to FIGS. 2 and 3, there is illustrated a collet-type chuck assembly 30 which is formed utilizing the above described workholder module. This chuck assembly is created by utilizing the module 10 and mounting thereon a collet 31 and an end cap 32.

The collet 31 is formed substantially as a rubber or elastic sleeve having a substantially cylindrical bore 33 extending therethrough. The collet sleeve is surrounded by an outer substantially conical wall 34 which slopes at substantially the same angle as the conical recess 18 so as to be snugly but slidably seatable therein.

The collet sleeve 31 is formed from a plurality of blocklike segments 35 which are disposed in a circular array, these segments being constructed of an elastomeric or rubberlike material. A plurality of metal plates or blades 36 are interposed between adjacent segments 35 and are fixed thereto, as by bonding. The metal blades 36 have the inner axially-extending edges 37 thereof projecting slightly inwardly beyond the elastomeric segments 35, and the blades similarly have the outer longitudinally extending edges 38 thereof projecting slightly outwardly beyond the elastomeric segments 35. These metal blades 36, at the axially inner ends thereof, have end portions 39 which project axially outwardly a significant extent beyond the elastomeric segments.

The forward axial end of the collet sleeve 31 has an annular step-like shoulder 41 which bears against the inner wall 42 of the end cap 32. This end cap 32 is of a substantially cup-shaped configuration in that it includes an annular flange 43 which is internally threaded so as to be threadably engageable with the threads 14 associated with the front end of the housing 11. This annular flange 43 has an end or base wall 44 which projects inwardly so as to partially extend across the open forward end of the housing, which base wall 44 defines thereon the inner surface 42 which acts as an abutment for the outer axial end of the sleeve collet 31. End wall 44 has a central opening 45 therethrough which is larger than the bore within the collet sleeve so as to permit a workpiece to be inserted therein.

To utilize the collet chuck 30 of FIGS. 2 and 3, and assuming the sleeve 15 is in the released position illustrated by FIG. 2, then a workpiece is inserted into the bore 33 of the elastomeric collet sleeve 31. Activating bar 26 is then moved axially forwardly which pushes the activating sleeve 15 forwardly. The conical surface 18 thereon reacts against the conical surface 34 of the elastomeric sleeve as defined by the outer edges 38 of blades 36, causing the latter to be resiliently compressed radially inwardly, as permitted by elastic deformation of the segments 35, so that the plurality of metal bars 36 hence have the inner edges 37 thereon moved into gripping engagement with the workpiece. Since the sleeve 31 has the front end thereof axially abutted against the end cap 32, the sleeve 31 undergoes solely radial compression, and hence the workpiece can be accurately axially positioned during the gripping engagement.

Figure 6:
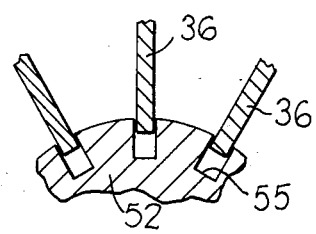
FIG. 6 is a fragmentary sectional view taken substantially along line VI—VI in FIG. 5.
Figure 4:
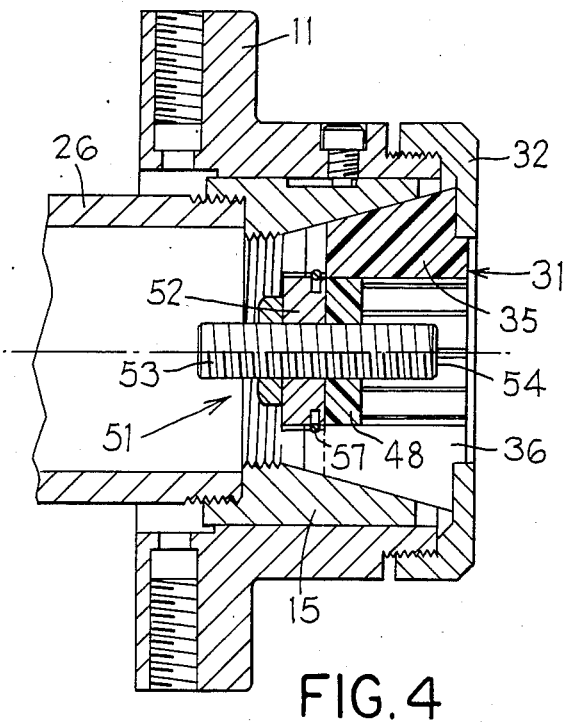
FIG. 4 is a view similar to FIG. 2, but showing the collet-type chuck further modified to include a workpiece stop therein.
Figure 5:
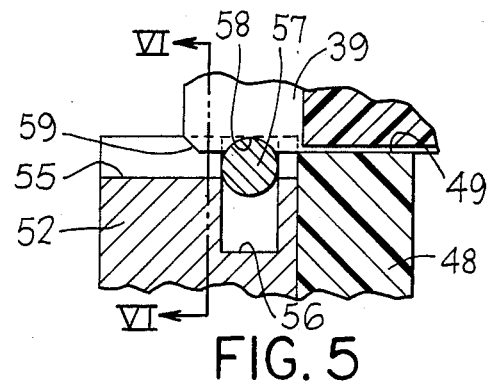
FIG. 5 is an enlarged sectional view illustrating the manner in which the workpiece stop mounts within the inner end of the elastomeric collet sleeve.

If the collet chuck 30 is being utilized for supporting a workpiece which must be accurately positioned and is only partially inserted into the sleeve collet, then the collet can be provided with a positive stop device 51 as illustrated by FIGS. 4–6. This stop device is positioned adjacent and mounted on the axially inner end of the collet sleeve 31. For this purpose, the stop device 51 includes an annular stop plate 52 having an axially elongated stop member 53 threadably engaged therewith and projecting coaxially therethrough, which stop member defines a workpiece-engaging stop surface 54 on the forward end thereof. The stop plate 52, in the annular periphery thereof, is provided with a plurality of axially extending grooves 55 disposed in angularly spaced relationship therearound, which grooves are aligned with and receive therein the radially inner portion of the rear part 39 of the metal blades 36, as illustrated by FIGS. 5 and 6.

Stop plate 52 also has an annular groove 56 formed therein and extending therearound, which groove is of substantial depth and accommodates therein a split resilient locking ring 57, the latter in its normally relaxed position being disposed so as to project slightly outwardly beyond the external periphery of the stop plate 52. This resilient lock ring 57 is designed to resiliently engage within an annular recess 58 formed in the inner edge of the rear blade part 39, which rear blade parts 39 all have a similar such recess 58 therein so as to effectively define an annular groove for accommodating the lock ring 57 as illustrated by FIG. 5. The rear corner 59 of each rear blade part 39 is also preferably rounded or chamfered.

The stop device 51 also preferably includes an annular washer 48 constructed of a firm rubber or elastomeric material, which washer 48 is disposed in surrounding relationship to the threaded stop member 53 directly adjacent the front face of the stop plate 52. The washer 48 is positioned so as to be supportingly disposed within the bore 33 adjacent the rearward end of the collet sleeve 31, and for this purpose the washer 48 has an outer annular wall 49 of a diameter similar to that of bore 33 so as to provide additional support for the collet sleeve adjacent the inner axial end thereof.

The positive stop device 51 is secured to the collet sleeve 31 when the latter is removed from the activating sleeve 15. For this purpose, the positive stop device is coaxially aligned with the rearward end of the collet sleeve 31, and the washer 48 is slidably inserted into the bore 33 of the collet sleeve, whereupon the chamfered corners 59 of the blade parts 39 cam against the split lock ring 57 and cause it to be resiliently deflected inwardly of the groove 56. The positive stop device is axially pushed further into the collet sleeve until the lock ring 57 resiliently expands so as to lockingly engage the recesses 58, and hence axially secure the positive stop device to the collet sleeve. When so secured, the threaded stop member 53 can be suitably rotated so as to axially adjust the position thereof, and hence locate the stop surface 54 at the desired axial location. When so located, as illustrated by FIG. 4, the stub end of a workpiece can hence be supported within the forward end of the collet while permitting accurate axial positioning of the workpiece. The washer 48 also provides additional support for the rearward end of the collet when the collet is radially compressed for gripping the workpiece, and this hence prevents undesired axially tipping of the blades 36 due to nonuniform radial compression of the collet.

Figure 7:
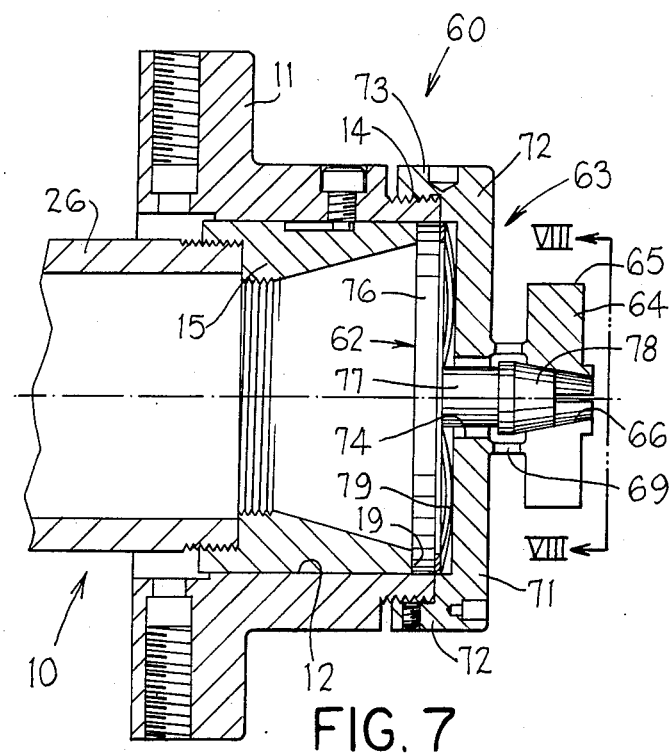
FIG. 7 is a central sectional view which illustrates the workpiece module modified to function as an expandable mandrel.
Figure 8:
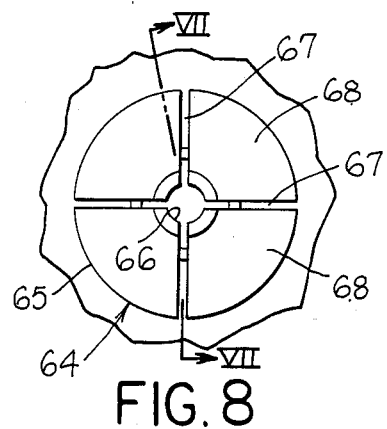
FIG. 8 is a fragmentary front view as taken substantially along VIII—VIII in FIG. 7.

Referring now to FIGS. 7 and 8, there is illustrated the workholder module 10 modified to form an expanding mandrel assembly 60. This mandrel assembly 60 includes therein the workholder module 10, and additionally mounts thereon an actuator 62 and a mandrel unit 63.

The mandrel unit 63 includes a substantially cylindrical mandrel 64 which is provided with a surrounding annular wall 65 adapted for gripping engagement with the internal bore of a workpiece. The cylindrical mandrel 64 has a conical bore 66 extending coaxially therethrough, and a plurality of slits or slots 67 project radially outwardly from this bore 66 through the outer annular surface 65 so as to divide the mandrel into a plurality of arcuate segments 68. There are four such slits 67 in the preferred embodiment, said slits being uniformly spaced apart so that each of the four segments 68 is hence of a substantially 90° extent.

The individual segments 68 of the cylindrical mandrel are secured to the outer end of an axially extending arm 69, the latter having its inner or rearward end secured to the base wall 71 of a mounting member or end cap 72, the latter being an integral part of the mandrel unit 63. This mounting member 72 is of a substantially cup-shaped configuration in that it includes an annular rearwardly projecting flange 73 which is internally threaded so as to be threadably engageable with the threads 14 provided on the front end of the housing 11. The base wall 71 of this mounting member 72 extends substantially across the forward end of the housing but is provided with an opening 74 extending coaxially therethrough, which latter opening provides coaxial communication between the mandrel bore 66 and the interior of the workholder module.

Considering now the actuator 62, same includes a main base plate 76 which is of a substantially cylindrical construction in that it is axially slidably supported within the forward end of the housing bore 12 and is thus disposed so as to abut against the forward end 19 of the activating sleeve 15. The axial thickness of plate 76 is less than the axial spacing between the base wall 71 and the end face 19 when the activating sleeve 15 is in the retracted position illustrated by FIG. 7. A plate-type spring 79 is disposed between the base plate 76 and the base wall 71 so as to normally urge the actuator 62 axially rearwardly against the front face 19.

The base plate 76 of actuator 62 has a substantially cylindrical stem 77 projecting coaxially forwardly therefrom through the opening 74, which stem 77 at its forward end is provided with a conical wedge 78, the latter having a slope substantially corresponding to that of the opening 66 so that the wedge 78 can be slidably inserted into the conical opening 66 to effect radially outward resilient expansion of the mandrel 64 when gripping of a workpiece is desired.

To activate the expanding mandrel illustrated by FIG. 7, and assuming it is in the release position illustrated by FIG. 7, then the workpiece is initially positioned in surrounding relationship to the cylindrical mandrel 64. The activating tube 26 is then axially moved forwardly, causing the sleeve 15 to push the actuator 62 forwardly. Wedge 78 then coacts with the conical bore 66 to cause radially outward expansion of the cylindrical mandrel 64, and hence cause the surface 65 thereof to grippingly engage the surrounding wall of an internal bore or opening as formed in the workpiece. When release of the workpiece is desired, the tube 26 is moved axially rearwardly, and the spring 79 causes the actuator 62 to be axially retracted.

Referring now to FIGS. 9 and 10, there is illustrated a step-type chuck assembly 80 formed by mounting a closer or end member 81 and a step chuck unit 82 on the workholder module 10.

The closer member 81 is of a generally cup-shaped configuration and includes a base wall 83 which partially closes off the front end of the housing and has a forwardly projecting annular flange 84, whereby the cup-shaped configuration of the closer member defines a forwardly-directed recess 85, which recess has the rear thereof bounded by the base wall 83. Recess 85 is surrounded by an inner annular side wall 86 which is of a conical configuration, which conical configuration is converging as it projects axially inwardly or rearwardly.

The closer member 81 has a further annular flange 87 which is integral with and projects rearwardly from the base wall 83. This latter annular flange 87 is internally threaded at 88 so as to be threadably engageable with the threads 14 provided on the front end of the housing to hence fixedly secure the closer member to the housing.

As to the step chuck unit 82, it comprises a one-piece member having a substantially cylindrical chuck plate 91 which is adapted to be received within the recess 85 of the closer member. This chuck plate 91 has a shallow cylindrical recess 92 formed therein, which recess extends inwardly from the front axial face 94 of the chuck plate and terminates at a bottom wall 93. The recess is surrounded by a radially inwardly directed annular surface 95 which functions for grippingly engaging an exterior annular surface of a workpiece.

Chuck plate 91 has a substantially cylindrical support hub 96 of smaller diameter projecting coaxially rearwardly therefrom. This support hub 96 projects axially through the closer member and into the bore of the activating sleeve 15. The rearward axial end of this cylindrical hub 96 is externally threaded at 97, and this external thread 97 is threadably coupled to the threaded bore 21 provided at the rearward end of the activating sleeve 15 so as to fixedly connect the activating sleeve 15 and step chuck unit 82 together. The hub 96 has a large diameter bore 98 formed therein, and the latter in turn communicates with a smaller diameter bore 99 which extends coaxially through the chuck plate 91.

The chuck plate 91 is provided with a plurality of slits or slots 101 which project radially from the bore 99 through the outer periphery of the plate. The outer annular surface 102 of this plate is tapered so as to effectively define a conical surface, the angle of which substantially corresponds to that of the annular side wall 86 so as to wedgingly cooperate therewith. This wedging cooperation between the tapered surfaces 86 and 102, coupled with the provision of the slits 101, which slits defied the chuck plate into a plurality (four in the preferred embodiment) of arcuate segments 100, hence permits these segments 100 to be resiliently deformed radially inwardly toward one another as the chuck plate is pulled axially rearwardly into the recess 85, and hence this causes the annular surface 95 to be moved into secure gripping engagement with an exterior annular surface of a workpiece.

To permit precise axial positioning of the workpiece within the recess 92, the chuck plate 91 has a plurality, here three, of small openings 103 extending axially therethrough, said openings being disposed in uniformly spaced relationship around the central axis of the chuck plate. Each opening 103 loosely slidably accommodates therein a cylindrical stop pin 104, the latter having a threaded stub on the rearward end thereof which is fixedly secured within a threaded opening 105 formed in the closer member. This stop pin 104 has a diameter which is slightly less than the diameter of the opening 103 so as to not interfere with the radial movement of the segments 100. Further, the stop pin 104 defines a stop surface 106 on the forward end thereof, the latter being spaced forwardly from the rear surface 93 of the recess, whereby the stop surfaces 106 on the plurality of stop pins hence effectively define a plane for precisely positioning the rear surface of the workpiece.

The stop pins 104 not only function as a workpiece positioning structure, but they also function as drive pins in that they transmit the rotational drive from the housing 11 through the closure member 81 to the step chuck unit 82.

The use and operation of the step chuck 80 illustrated in FIGS. 9 and 10 is believed self evident from the description set forth above.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A workholder assembly, comprising:
   a sleevelike housing adapted for attachment to a machine tool, said housing having a substantially cylindrical bore extending therethrough, said bore terminatng in an annular front end which surrounds said bore;
   an activating sleeve coaxially and slidably supported within said cylindrical bore, said activating sleeve defining therein a substantially conical bore which converges as it projects axially rearwardly of said housing;
   said activating sleeve having first annular thread means provided coaxially thereon adjacent the rearward end thereof for connection to an axially-movable actuator bar as associated with the machine tool;
   said activating sleeve having second annular thread means provided coaxially thereon adjacent the rearward end thereof, said second thread means comprising an internal thread disposed adjacent the rearward end of said conical bore, said internal thread having a diameter no larger than the diameter of said conical bore at the rear end thereof; and
   workpiece engaging means having an annular workpiece-engaging surface which is radially deformed into gripping engagement with a workpiece in response to slidable displacement of said activating sleeve from a released position into an engaged position;
   said workpiece-engaging means including a first removable member coaxially fixedly but removably secured to said housing directly adjacent the front end thereof, and a second removable member coaxial with and disposed at least partially within said cylindrical bore adjacent the front end of said housing and in direct force-transfer engagement with said activating sleeve, said second removable member having thereon an annular conical surface for causing radial deformation of said workpiece-engaging surface in response to axial sliding displacement of said activating sleeve.

2. An assembly according to claim 1, wherein said first and second thread means are of different diameters, and wherein said activating sleeve has an axially forwardly facing abutment surface defined thereon adjacent the front end thereof.

3. An assembly according to claim 1, wherein said second removable member comprises a sleeve collet having an outer annular surface defining said annular conical surface, said sleeve collet being concentrically disposed within the conical bore of said activating sleeve, said sleeve collet being constructed primarily of a rubberlike elastomeric material.

4. An assembly according to claim 1, wherein said workpiece engaging means comprises a step chuck with said second removable member comprising a chuck member having a radially-split chuck plate positioned adjacent the front end of said housing, said chuck plate having a hub part which projects coaxially rearwardly into and through said conical bore and is threadably engaged with said second thread means.

5. An assembly according to claim 1, wherein said first removable member includes a mandrel member fixed to and projecting coaxially forwardly of said housing, said mandrel member having a conical bore extending therethrough, and said second removable member having a rear plate part which is slidably positioned within said cylindrical bore and engaged with a front abutment surface of said activating sleeve, said second removable member having a front wedge part which is fixed to and positioned axially forwardly of said rear plate part and is slidably engaged within the conical bore of said mandrel member.

6. A workholder assembly, comprising:

a sleevelike housing adapted for attachment to a machine tool, said housing having a substantially cylindrical bore extending therethrough, said housing terminating in an annular front end which surrounds said bore;

an activating sleeve coaxially and slidably supported within said cylindrical bore, said activating sleeve defining therein a substantially conical bore which converges as it projects axially rearwardly of said housing;

axially-movable actuator bar means fixedly connected to said activating sleeve for axially slidably displacing said sleeve between engaged and released positions; and workpiece engaging means having an annular workpiece-engaging surface which is radially deformed into gripping engagement with a workpiece in response to slidable displacement of said activating sleeve from said released to said engaged position;

said workpiece-engaging means including a first removable member coaxially fixedly and removably secured to said housing adjacent the front end thereof, and a second removable member coaxial with and disposed at least partially within said cylindrical bore adjacent the front end of said housing, said second removable member being disposed in direct force-transfer engagement with said activating sleeve for axial displacement synchronously therewith;

one of said first and second removable members having an annular platelike portion disposed forwardly of said housing and coaxially aligned therewith, said annular platelike portion being radially split into a plurality of arcuate segments so as to be radially elastically deformable, said annular platelike portion having said annular workpiece-engaging surface thereon;

said second removable member having thereon an outer annular conical surface, and said first removable member having an inner annular conical surface disposed in slidable and wedging engagement with the outer annular conical surface on said second removable member for causing radial elastic deformation of said annular platelike member and for causing radial deformation of said workpiece engaging surface thereon in response to axial sliding displacement of said second removable member by said activating sleeve.

7. An assembly according to claim 1, wherein said second removable member comprises a sleeve collet having an outer annular surface of conical configuration, said sleeve collet being concentrically disposed within the conical bore of said activating sleeve, said sleeve collet being constructed primarily of a rubberlike elastomeric material, and said first removable member including an end wall which radially overlaps and axially abuts the front axial end of said sleeve collet for maintaining said sleeve collet in an axially fixed position with respect to said housing.

8. An assembly according to claim 7, wherein said first removable member comprises a cup-shaped cap having a flange which is threadably engaged with the front end of said housing, said cap having a central opening therethrough aligned with the central bore formed within said sleeve collet for permitting a workpiece to be inserted therein.

9. An assembly according to claim 7, including a positive stop device fixedly but removably mounted on said sleeve collet adjacent the rearward end thereof for limiting the axial insertion of a workpiece into said sleeve collet, said sleeve collet including a plurality of arcuate segments of elastomeric material disposed in a circular array and having thin metal plates fixedly interposed therebetween, said metal plates including rear parts which project axially beyond the elastomeric segments adjacent the rearward end of said sleeve collet, said positive stop device including a stop plate which is positioned adjacent the rearward end of said sleeve collet and has a series of grooves therein which receive the rearward ends of said metal plates, and a resilient locking ring coacting between said stop plate and said metal plates for axially securing same together, said stop plate mounting thereon an axially elongated stop member which is axially adjustable relative to the stop plate and projects forwardly therefrom into the sleeve collet for defining a stop surface which is engageable with a workpiece.

10. An assembly according to claim 6, wherein said annular platelike portion is fixedly connected to and forms a part of said first removable member, said first removable member including a cup-shaped portion which is removably but threadably coupled to the front end of said housing, said annular platelike portion defining an interior mandrel which is positioned forwardly of said housing and is coaxially aligned with and elastically supported on said cup-shaped portion, said mandrel having a conical bore defining said inner conical surface and extending coaxially therethrough in alignment with said cylindrical bore, said second removable member comprising an actuator having a base portion slidably disposed within said cylindrical bore adjacent the forward end of said housing and maintained in abutting engagement with the forward end of said activating sleeve, said actuator including a cam portion which is coaxially fixed to and projects axially forwardly from said base portion, said cam portion defining a substantially conical wedge which defines thereon said outer conical surface and is slidably received within the conical bore defined within said mandrel.

11. An assembly according to claim 6, wherein said annular platelike portion is a part of said second removable member and defines a platelike chuck disposed adjacent the front end of said housing, said second removable member having a hub portion which is coaxial with said platelike chuck and which projects axially into said cylindrical bore and into and through the conical bore of said activating sleeve, said hub portion and said activating sleeve being axially but releasably coupled together adjacent the axially rearward end of said activating sleeve, said platelike chuck having a workpiece-receiving recess opening inwardly from the front axial face thereof, said platelike chuck being radially split to define said plurality of arcuate segments so that the chuck can be radially elastically deformed, said chuck defining thereon a substantially annular surface which externally surrounds said recess and defines said workpiece-engaging surface, said first removable member having an annular portion provided with said inner annular conical surface thereon which is disposed in slidable and wedging engagement with the outer annular conical surface of said second removable member for causing elastic radial deformation of said chuck in response to axial displacement of said second removable member due to axial slidable displacement of said activating sleeve.

12. An assembly according to claim 11, wherein said first removable member has a plurality of stop pins removably fixed thereto and projecting axially forwardly therefrom through small openings formed in said chuck so that said stop pins project into said workpiece-receiving recess and define therein a stop surface for the workpiece which is spaced axially from the bottom of said recess.

13. A workpiece holder assembly adapted for mounting on a machine tool for annular gripping engagement with a workpiece, comprising:
a sleevelike housing adapted to be mounted on said machine tool, said housing having a substantially cylindrical bore which is formed therein and opens outwardly through the front end thereof;
a sleevelike activating sleeve coaxially and slidably supported within said cylindrical bore, said activating sleeve having a substantially conical bore extending coaxially therethrough with said bore being of a converging configuration as it projects axially rearwardly, said activating sleeve having means associated with the rearward end thereof for fixed attachment to an axially-movable barlike actuator associated with the machine tool;
a cup-shaped end member fixedly but removably secured to said housing adjacent the front end thereof, said end member having a base wall which projects radially inwardly in at least partial overlapping relationship with said cylindrical bore and said activating sleeve, said end member having an annular part associated therewith and defining thereon a first conical annular wall which is coaxially aligned with said cylindrical bore;
an actuating member coaxially aligned with said bore and being axially interconnected with said activating sleeve so as to be axially slidably movable in unison therewith, said actuating member including a rear portion which is disposed within said cylindrical bore and axially operatively engaged with said activating sleeve, said actuating member including a front part which is concentrically disposed relative to the annular part of said end member and has a second conical annular surface thereon disposed in axially sliding and wedging engagement with said first conical surface, one of said annular and front parts being radially split to define a workpiece-engaging member which is radially elastically deformable in response to relative axial wedging movement between said first and second conical surfaces, said workpiece-engaging member having an annular workpiece-engaging surface defined thereon.

14. An assembly according to claim 13, wherein the rear portion of said actuating member comprises a platelike member which is axially slidably supported within said cylindrical bore adjacent the front end of said housing, said platelike member being disposed in axial abutting engagement with the front end of said activating sleeve and axially but loosely confined between said activating sleeve and said end member, the front part of said actuating member including a substantially conical wedge member which projects coaxially outwardly of the platelike member forwardly beyond the base wall of said end member, said wedge member defining said second conical surface thereon, said end member having said workpiece-engaging member mounted thereon and positioned axially forwardly from said base wall, said workpiece-engaging member having a substantially conical bore extending therethrough and defining said first conical surface, said wedge member being axially slidably received within said last-mentioned bore, said workpiece-engaging member having said workpiece-engaging surface defined around the exterior thereof for engagement within the bore of a workpiece.

15. An assembly according to claim 13, wherein the rear portion of said actuating member projects coaxially inwardly of said housing and coaxially through said activating sleeve, said rear portion being nonrotatably and axially connected to said activating sleeve adjacent the rearward end thereof, said actuating member having said workpiece-engaging member fixed thereto adjacent the forward end of said rear portion, said workpiece-engaging member being formed substantially as a circular plate positioned forwardly of the base wall of said end member, said circular plate having said second conical surface formed around the exterior periphery thereof, and the annular part of said end member comprising an annular flange which externally surrounds said circular plate and has said first surface formed on the inner wall thereof.

16. An assembly according to claim 15, wherein said circular plate has a substantially cylindrical recess which opens inwardly from the front axial face thereof and terminates in a rear wall, said recess being defined by said annular workpiece-engaging surface, said circular plate having a plurality of circumferentially spaced openings projecting axially through said rear wall for communication with said recess, said openings being of small diameter, and a plurality of stop pins fixed to said end member and projecting axially forwardly through the respective small openings so that the forward ends of the pins define stop surfaces which are positioned within said recess in forwardly spaced relationship from said rear wall.

17. An assembly according to claim 16, wherein the rear portion of said actuating member is threadably coupled to said activating sleeve adjacent the rearward end thereof, and wherein said stop pins have the rearward axial ends thereof threadably coupled to said end member.

18. A workpiece holder assembly adapted for mounting on a machine tool for annular gripping engagement with a workpiece, comprising:

a sleevelike housing adapted to be mounted on said machine tool, said housing having a substantially cylindrical bore which is formed therein and opens outwardly through the front end thereof;

a sleevelike activating sleeve coaxially and slidably supported within said cylindrical bore, said activating sleeve having a substantially uniform-diameter outer cylindrical wall which is coaxially and slidably supported within said cylindrical bore, said activating sleeve having a substantially conical bore extending coaxially therethrough with said bore being of a converging configuration as it projects axially rearwardly, said activating sleeve having means associated with the rearward end thereof for fixed attachment to an axially-movable barlike actuator associated with the machine tool;

step-chuck means removably connected to said housing and said activating sleeve for permitting annular gripping engagement with a workpiece, said step-chuck means including a first one-piece member fixedly and removably attached to said housing and a second one-piece member fixedly and removably attached to said activating sleeve so that said second member is axially movable relative to said first member to control gripping engagement with the workpiece;

said first one-piece member including a base wall disposed closely adjacent the free end of said housing, a first annular flange projecting axially rearwardly from said base wall in coaxial alignment with said cylindrical bore and being releasably threadably coupled to said housing adjacent the free end thereof, and a second annular flange coaxially aligned with said cylindrical bore and projecting axially forwardly from said base wall, said second annular flange defining thereon an inner truncated conical surface which is substantially coaxially aligned with said cylindrical bore;

said second one-piece member including a chuck plate which is positioned axially forwardly adjacent the base wall of said first member, said chuck plate defining thereon adjacent the radially outer edge thereof an annular flange which projects axially forwardly in substantially coaxial relationship with the cylindrical bore, said last-mentioned annular flange cooperating with the chuck plate to define a recess which opens axially rearwardly of the chuck plate and terminates in a forwardly-facing rear wall, said last-mentioned annular flange having thereon an inner annular wall adapted for gripping engagement with a workpiece;

said chuck plate being radially split to define several radially elastically deformable segments, and said chuck plate defining thereon an outer truncated conical annular surface which is substantially coaxially aligned with the cylindrical bore and is adapted to be wedgingly engaged with the inner conical surface on said first member in response to axial displacement of said chuck plate;

said second one-piece member also including a hub portion which is fixed to and projects coaxially rearwardly from said chuck plate, said hub portion projecting axially into and at least partially through said activating sleeve, said hub portion having the axially rearward end thereof threadably coupled to said activating sleeve in the vicinity of the axially rearward end of the altter; and said step-chuck means including a plurality of circumferentially-spaced stop pins threadably fixed to said base wall of said first member and projecting axially forwardly therefrom through respective small openings formed in said chuck plate so that the forward ends of the stop pins define stop surfaces which are positioned within said recess in forwardly space relationship from said rear wall.

* * * * *

UNITED STATES PATENT AND TRADEMARK OFFICE
CERTIFICATE OF CORRECTION

PATENT NO. : 4 699 389

DATED : October 13, 1987

INVENTOR(S) : James R. BUCK

It is certified that error appears in the above-identified patent and that said Letters Patent is hereby corrected as shown below:

Column  9, line 53; change "ofisaid" to ---of said---.

Column 12, line 44; after "first" insert ---conical---.

Column 14, line 29; change "altter" to ---latter---.

Column 14, line 37; change "space" to ---spaced---.

Signed and Sealed this

Twenty-ninth Day of March, 1988

Attest:

DONALD J. QUIGG

*Attesting Officer*  *Commissioner of Patents and Trademarks*